(12) United States Patent
Hanai

(10) Patent No.: US 11,106,234 B2
(45) Date of Patent: Aug. 31, 2021

(54) INPUT AND OUTPUT APPARATUS PROVIDED WITH MICROCOMPUTER POWERED FROM DC-DC CONVERTER AND CONFIGURED TO OPERATE ON CLOCK SIGNAL

(71) Applicant: DENSO WAVE INCORPORATED, Aichi-pref. (JP)

(72) Inventor: Takashi Hanai, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 338 days.

(21) Appl. No.: 16/364,798

(22) Filed: Mar. 26, 2019

(65) Prior Publication Data
US 2019/0294202 A1 Sep. 26, 2019

(30) Foreign Application Priority Data

Mar. 26, 2018 (JP) .............................. JP2018-057480

(51) Int. Cl.
*G06F 1/08* (2006.01)
*H02M 1/00* (2006.01)
*H02M 3/00* (2006.01)

(52) U.S. Cl.
CPC ................ *G06F 1/08* (2013.01); *H02M 1/00* (2013.01); *H02M 3/00* (2013.01)

(58) Field of Classification Search
CPC ........................................................ G06F 1/08
USPC ........................................................ 713/501
See application file for complete search history.

(56) References Cited

U.S. PATENT DOCUMENTS

| 8,228,098 | B2 * | 7/2012 | Zhao | H03K 7/08 327/114 |
| 8,970,269 | B2 * | 3/2015 | Nakanishi | H03K 5/04 327/172 |
| 2013/0020978 | A1 | 1/2013 | Yamada et al. | |

* cited by examiner

*Primary Examiner* — Hai L Nguyen
(74) *Attorney, Agent, or Firm* — Oliff PLC

(57) ABSTRACT

An input/output apparatus for a PLC includes at least first and second sub-systems. In each sub-system, a DC-DC converter controls a voltage of an external power supply to a target voltage by switching a PWM signal, and a microcomputer is driven by a clock signal. In the microcomputer, a PWM signal generating unit generates the PWM signal and a frequency analyzing unit samples an inputted voltage at a cycle shorter than a cycle of the PWM signal, and analyzes the frequency of the inputted voltage. The frequency analyzing unit acquires a frequency of the PWM signal from the frequency of the inputted voltage, calculates a frequency of the clock signal, and outputs an abnormality-notifying signal when the frequency of the clock signal falls outside a prescribed range. An output voltage of the DC-DC converter of the first sub-system is inputted to the frequency analyzing unit of the second sub-system.

11 Claims, 5 Drawing Sheets

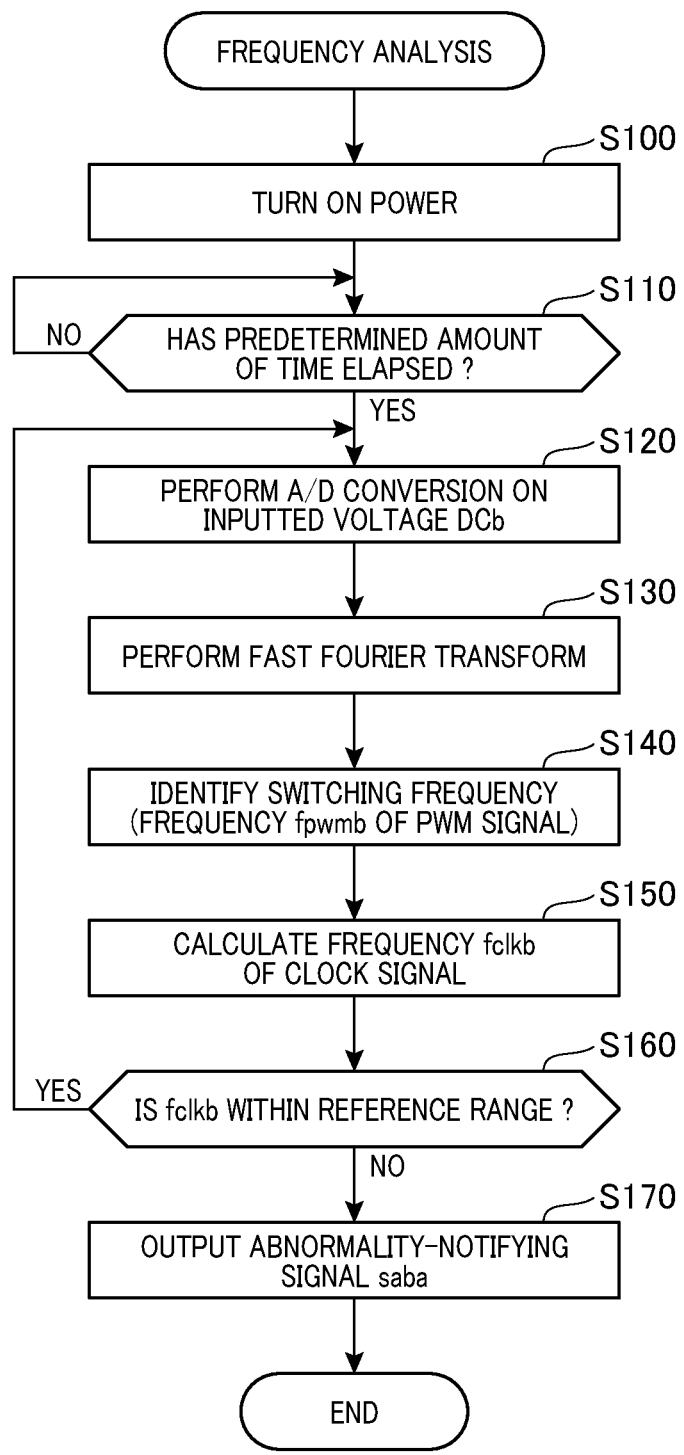

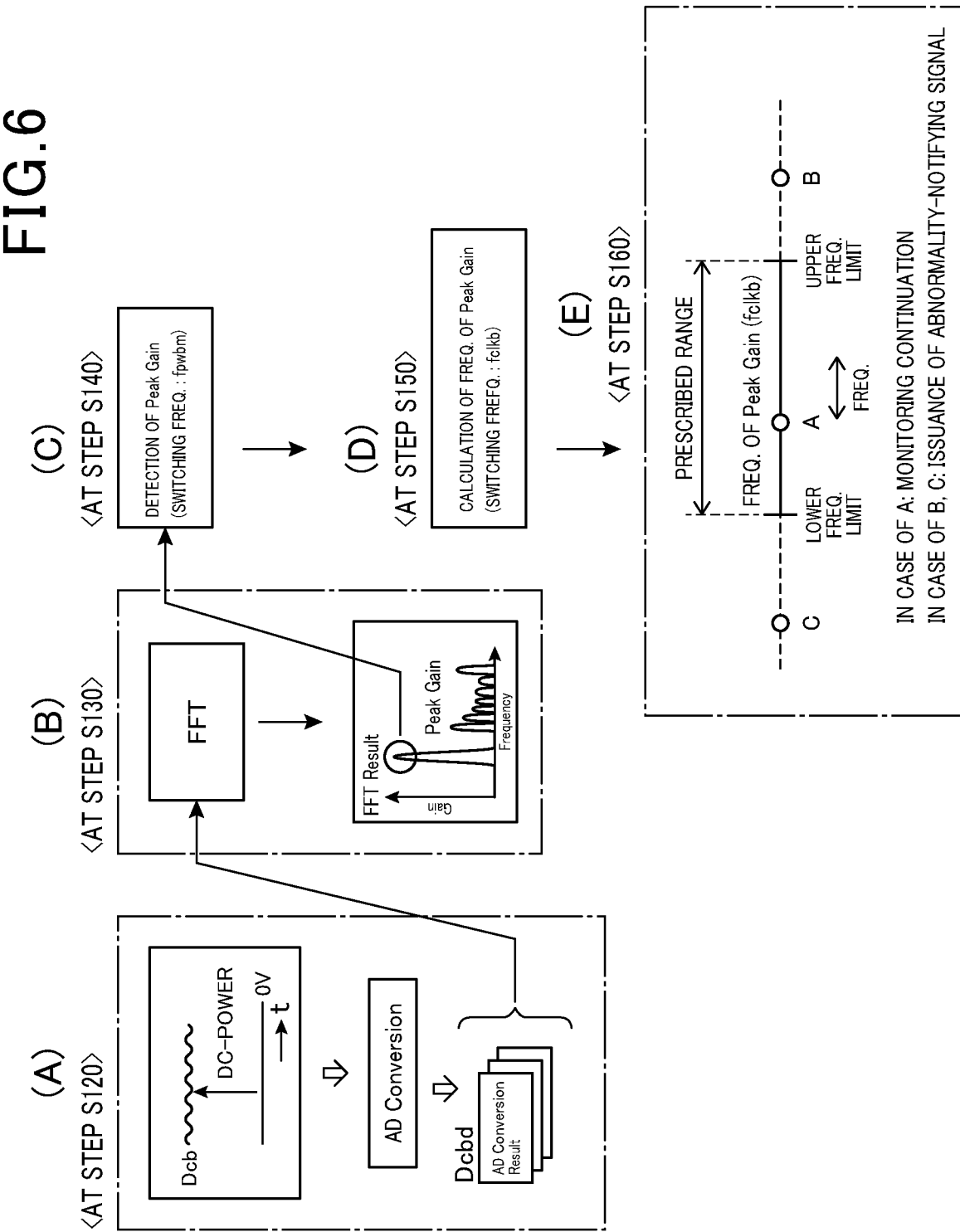

INPUT AND OUTPUT APPARATUS PROVIDED WITH MICROCOMPUTER POWERED FROM DC-DC CONVERTER AND CONFIGURED TO OPERATE ON CLOCK SIGNAL

CROSS-REFERENCE TO RELATED APPLICATION

This application is based on and claims the benefit of priority from earlier Japanese Patent Application No. 2018-057480 filed on Mar. 26, 2018, the description of which is incorporated herein by reference.

BACKGROUND

Technical Field

The present invention relates to an input and output apparatus provided with a microcomputer powered from a DC-DC converter and configured to operate on a clock signal, and in particular, to the input and output apparatus which can preferably be applied to a programmable logic controller (PLC).

Related Art

An input and output apparatus for a programmable logic controller (PLC) is prescribed an input response time and an output response time. The input response time is an amount of time required for input information to be transmitted to the PLC. The output response time is an amount of time required until a signal from the PLC is reflected in an output. The input response time and the output response time are designed based on a frequency of a clock signal that drives the software logic of the PLC. Here, for example, in a PLC that provides enhanced safety performance, when the clock frequency falls outside a prescribed range, sufficient response performance cannot be ensured.

Therefore, a process such as stopping of the PLC is performed. For example, a method described in JP-A-2013-26827 is known as a means for detecting variations in the frequency (pulse cycle) of the clock signal. In JP-A-2013-26827, a central processing unit generates a pulse width modulation (PWM) signal using an inputted clock signal. The frequency of the clock signal is then determined as a result of a pulse cycle and a pulse width of the PWM signal being detected. The input and output apparatus for a PLC may include two of this central processing unit described above. The PWM signal generated by one central processing unit may be inputted to the other central processing unit.

As a result, the two central processing units may mutually monitor the pulse cycles (the frequency of the clock signal) and the pulse widths, and mutually monitor the frequencies of the clock signals respectively inputted to the central processing units. In this case, the pulse cycle (the frequency of the clock signal) and the pulse width of the PWM signal of one central processing unit is determined by the clock signal of the other central processing unit.

The PWM signal is generated based on the clock signal. Therefore, when the clock signal drifts in a certain direction, the pulse cycle and the pulse width of the PWM signal also drift in the same direction. Here, when the clock signal of one central processing unit drifts in a certain direction, the clock signal of the other central processing unit may also drift in the same direction. For example, when an environmental temperature increases, the frequencies of the two clock signals tend to drift in the same direction in accompaniment with the increase in temperature.

When the PWM signal of one central processing unit and the clock signal of the other central processing unit drift in the same direction, because the pulse cycle (the frequency of the clock signal) and the pulse width of the PWM signal of one central processing unit is determined with reference to the clock signal of the other central processing unit, a case in which the drifting of the PWM signal and the clock signal cannot be accurately detected is assumed.

SUMMARY

In light of the above-described issues, it is thus desired to provide an aspect described below.

(1) According to an aspect of the present disclosure, an input and output apparatus is provided. The input and output apparatus includes at least a first sub-system and a second sub-system. The sub-system includes: a direct current-to-direct current (DC-DC) converter that controls an output voltage to a target voltage by switching a PWM signal; a clock signal generating unit that generates a clock signal; and a microcomputer that is supplied electric power from the DC-DC converter and driven by the clock signal. The microcomputer includes: a PWM signal generating unit that generates the PWM signal using the clock signal; and a frequency analyzing unit that samples an inputted voltage at a cycle that is shorter than a cycle of the pulse width modulation signal and analyzes the frequency of the inputted voltage. The frequency analyzing unit acquires a frequency of the PWM signal from the frequency of the inputted voltage, calculates a frequency of the clock signal, and outputs an abnormality-notifying signal outside the input and output apparatus when the frequency of the clock signal falls outside a range prescribed in advance. The output voltage of the DC-DC converter of the first sub-system is inputted to the frequency analyzing unit of the second sub-system.

According to this aspect, the output voltages of the DC-DC converters are mutually analyzed through use of the frequency analyzing units, without the pulse cycle and the pulse width of the PWM signal being detected. A switching frequency is thereby analyzed, and the frequency of the clock signal is acquired. Consequently, when the clock signal of one sub-system shifts from a reference value, this shift can be detected. In addition, the inputted voltage is sampled at a cycle that is shorter than the cycle of the PWM signal. The frequency of the inputted voltage is then analyzed, and the frequency of the clock signal is calculated. Consequently, even should the clock signals of the first and second sub-systems drift in the same direction, an abnormality in the clock signal frequency can be accurately detected.

(2) In addition, in the input and output apparatus according to the above-described aspect, the output voltage of the DC-DC converter of the second sub-system may be inputted to the frequency analyzing unit of the first sub-system. According to this aspect, the second sub-system monitors the clock signal of the first sub-system, and the first sub-system monitors the clock signal of the second sub-system. In this manner, the first sub-system and the second sub-system can mutually monitor the clock signal of the other.

(3) In the input and output apparatus according to the above-described aspect, the frequency analyzing unit may include: an analog-to-digital (A/D) converting unit that performs an A/D conversion on an inputted voltage; a fast Fourier transform unit; and a frequency determining unit.

According to this aspect, the frequency of the output voltage of the DC-DC converter can be easily acquired. The frequency of the PWM signal can be acquired.

(4) In the input and output apparatus according to the above-described aspect, the DC-DC converter may include: an internal PWM signal generating unit that generates an internal PWM signal that is a PWM signal that differs from the foregoing PWM signal; and a selecting unit that selects between the PWM signal inputted from outside the sub-system and the internal PWM signal. The selecting unit may select the internal PWM signal as a signal to be used for switching immediately after startup, and switch from the internal PWM signal to the PWM signal inputted from outside the sub-system after elapse of an amount of time prescribed in advance after startup. According to this aspect, the DC-DC converter can perform switching based on the internal PWM signal and output a voltage, in a state in which the PWM signal from the microcomputer is not inputted, immediately after startup of the input and output apparatus and before startup of the microcomputer.

(5) In the input and output apparatus according to the above-described aspect, the input and output apparatus may further include a stopping unit that stops the clock signal generating unit of the sub-system when a stop signal from outside the input and output apparatus is received. According to this aspect, the clock signal is stopped when the stop signal is received from outside the input and output apparatus.

The present disclosure can be actualized according to various aspects. For example, in addition to the input and output apparatus, the present disclosure can be actualized according to aspects such as a clock signal monitoring apparatus and a clock signal monitoring method.

BRIEF DESCRIPTION OF THE DRAWINGS

In the accompanying drawings:

FIG. 5 is an operation flowchart of an operation performed by the frequency analyzing unit; and FIG. 6 is an illustration explaining processes or operations performed at steps S120 to S160 shown in FIG. 5.

DETAILED DESCRIPTION OF THE PREFERRED EMBODIMENTS

With reference to FIGS. 1 to 5, an exemplary embodiment of an input and output apparatus according to the present disclosure will now be described in detail.

Figure 1:
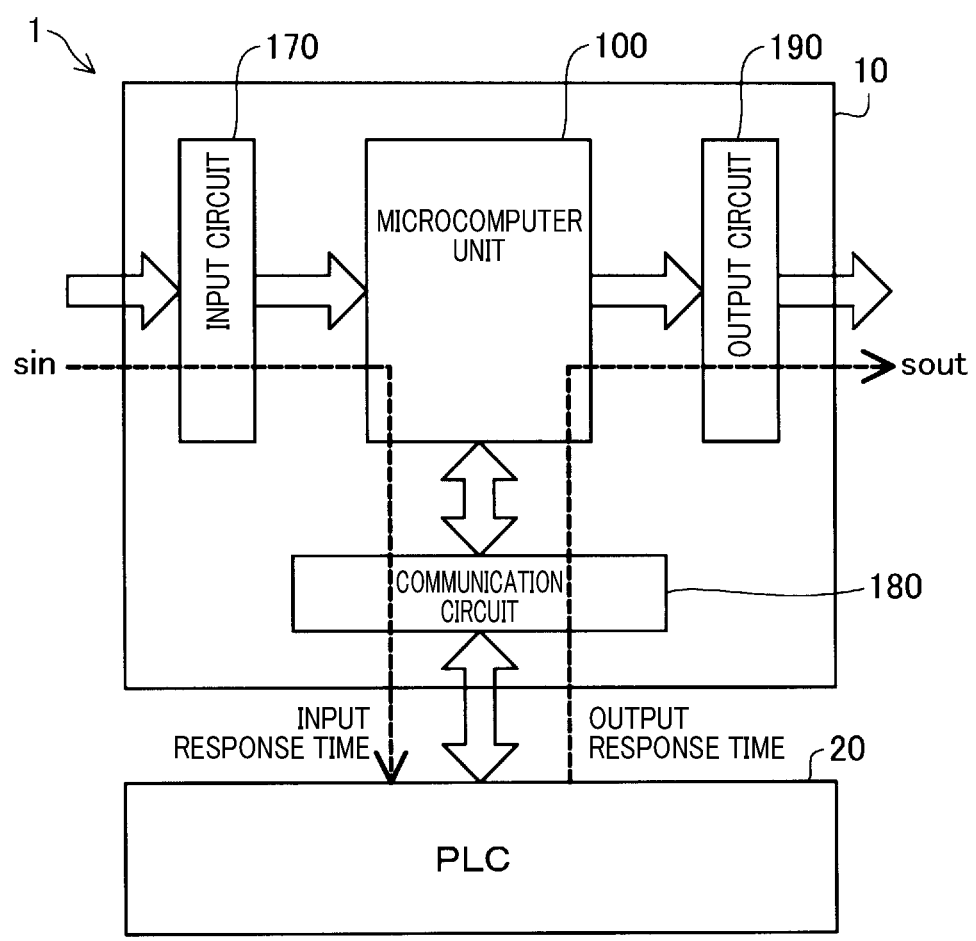
FIG. 1 is an explanatory diagram of an overall configuration of a PLC.

FIG. 1 is an explanatory diagram of an overall configuration of a PLC system 1. The PLC system 1 includes a PLC input and output apparatus 10 and a PLC 20. The PLC input and output apparatus 10 includes a microcomputer unit 100, an input circuit 170, a communication circuit 180, and an output circuit 190. In the PLC input and output apparatus 10, a signal sin is inputted to the input circuit 170 from outside the PLC system 1. The PLC input and output apparatus 10 then inputs the signal sin to the PLC 20 via the microcomputer unit 100 and the communication circuit 180.

The PLC 20 processes the inputted signal sin and outputs a signal sout that is a processing result. The signal sout is transmitted to the output circuit 190 via the communication circuit 180 and the microcomputer unit 100. The output circuit 190 then outputs the signal sout.

The PLC system 1 is generally prescribed an input response time and an output response time. The input response time is an amount of time from when the signal sin is inputted to the input circuit 170 until the signal sin is transmitted to the PLC 20. The output response time is an amount of time from when the signal sout is outputted from the PLC 20 until the signal sout is outputted from the output circuit 190. The input response time and the output response time are dependent on a frequency of a clock signal that drives the microcomputer unit 100.

Figure 2:
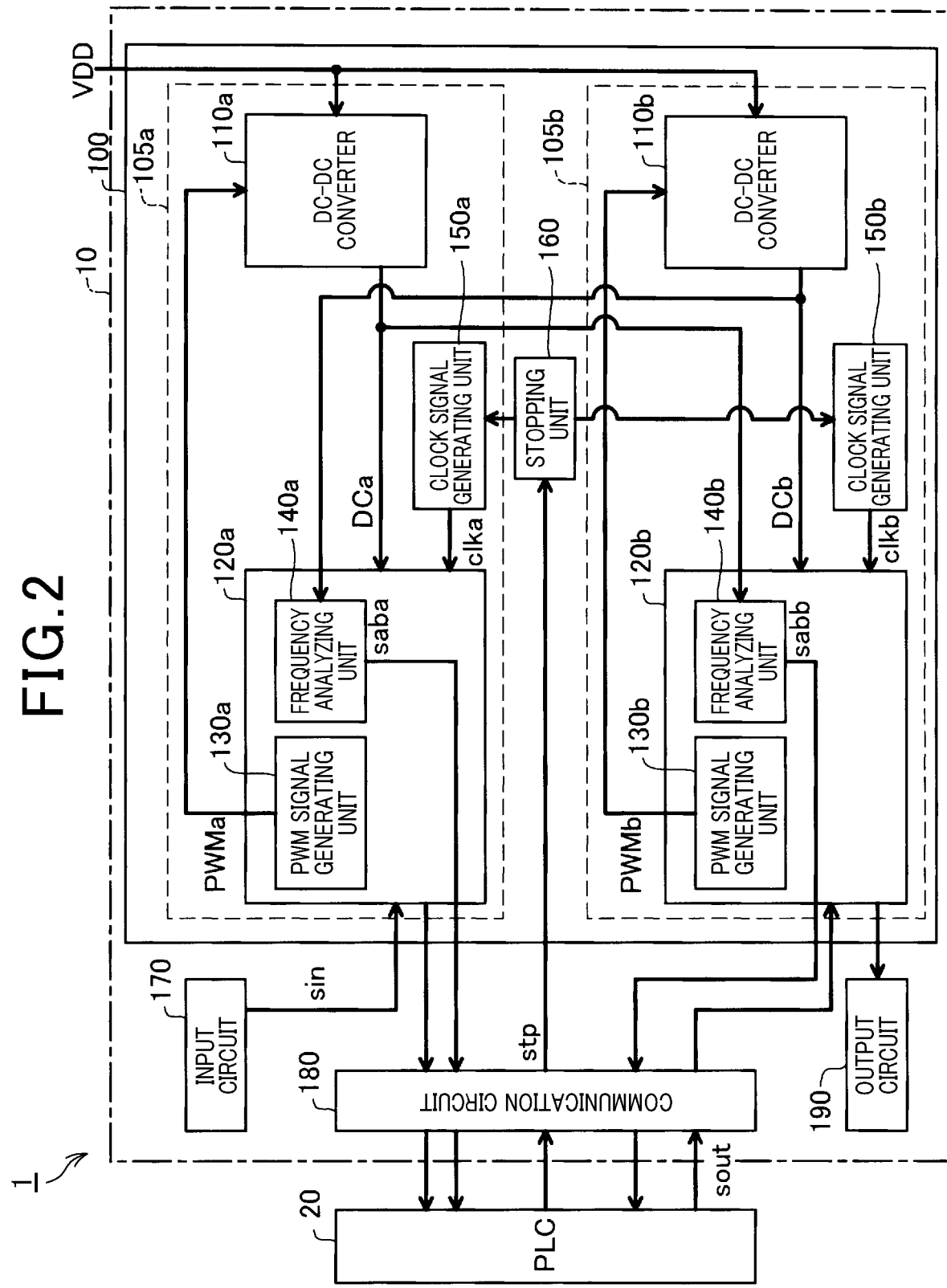
FIG. 2 is an explanatory diagram of an overall configuration of a microcomputer unit.

FIG. 2 is an explanatory diagram of an overall configuration of the microcomputer unit 100. The microcomputer unit 100 includes a first sub-system 105a, a second sub-system 105b, and a stopping unit 160. The signal sin is inputted to the first sub-system 105a from the input circuit 170. The signal sin is then outputted to the communication circuit 180. The signal sout is inputted to the second sub-system 105b from the PLC 20 via the communication circuit 180. The signal sout is then outputted to the output circuit 190.

Aside from the foregoing configuration, the first sub-system 105a and the second sub-system 105b have the same configurations. Therefore, the first sub-system 105a will be described as an example. A description of the second sub-system 105b will be omitted. Here, according to the present embodiment, for the reference number of each configuration of the second sub-system 105b, the reference number of the corresponding configuration of the first sub-system 105a in which the suffix "a" is changed to "b" is used.

The first sub-system 105a includes a DC-DC converter 110a, a microcomputer 120a, and a clock signal generating unit 150a.

The clock signal generating unit 150a generates a clock signal clka. The clock signal clka is inputted to the microcomputer 120a and serves as a clock signal that drives the microcomputer 120a.

The microcomputer 120a includes a PWM signal generating unit 130a and a frequency analyzing unit 140a. For example, the PWM signal generating unit 130a generates a PWM signal PWMa by dividing the frequency of the clock signal clka. The PWM signal PWMa has a frequency that is lower than the frequency of the clock signal clka. The frequency analyzing unit 140a analyzes the frequency of an inputted voltage. When determined that the frequency of the inputted voltage falls outside a predetermined range as a result of the analysis of the frequency of the inputted voltage, the frequency analyzing unit 140a outputs an abnormality-notifying signal saba which notifies an abnormality state of the system. The abnormality-notifying signal saba is inputted to the PLC 20.

The DC-DC converter 110a is a switching power supply that supplies electric power to the microcomputer 120a. The DC-DC converter 110a performs switching using the PWM signal PWMa generated by the PWM signal generating unit 130 and controls a direct-current voltage DCa to a target voltage. The DC-DC converter 110a then outputs the direct-current voltage DCa.

According to the present embodiment, the output voltage DCa of the DC-DC converter 110a in the first sub-system 105a is inputted to a frequency analyzing unit 140b of a microcomputer 120b in the second sub-system 105b. In addition, an output voltage DCb of a DC-DC converter 110b in the second sub-system 105b is inputted to the frequency analyzing unit 140a of the microcomputer 120a in the first sub-system 105a. That is, according to the present embodiment, the frequency analyzing units 140a and 104b each receive the input of the output voltage DCb or DCa of the DC-DC converter 110b or 110a of the other sub-system 105b or 105a. The frequency analyzing units 140a and 104b then mutually monitor and analyze the frequencies.

The stopping unit 160 stops the clock signal generating units 150a and 150b when a stop signal stp is received from the PLC 20. As a result, the clock signals clka and clkb are stopped and the microcomputer unit 100 is stopped.

Figure 3:
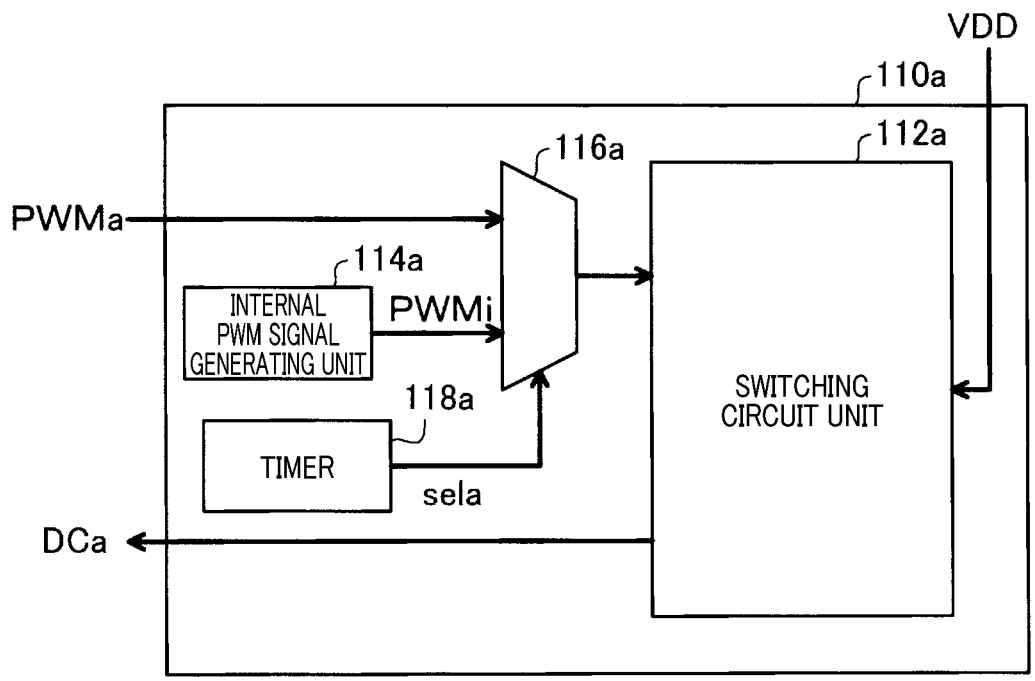
FIG. 3 is an explanatory diagram of an overall configuration of a DC-DC converter.

FIG. 3 is an explanatory diagram of an overall configuration of the DC-DC converter 110a. The DC-DC converter 110a includes a switching circuit unit 112a, an internal PWM signal generating unit 114a, a selecting unit 116a, and a timer 118a. The switching circuit unit 112a performs switching using the PWM signal, and generates the output voltage DCa from an external power supply VDD. The internal PWM signal generating unit 114a generates an internal PWM signal PWMi when the external power supply VDD is applied.

The frequency and the duty ratio of the internal PWM signal PWMi are preferably substantially identical to the frequency and the duty ratio of the PWM signal PWMa. However, as long as the switching circuit unit 112a is able to output a substantially similar voltage, the frequency and the duty ratio of the internal PWM signal PWMi may not be substantially identical to the frequency and the duty ratio of the PWM signal PWMa. The selecting unit 116a selects the PWM signal PWMa or the internal PWM signal PWMi as the signal to be inputted to the switching circuit unit 112a, based on a selection signal sela from the timer 118a. The timer 118a transmits the selection signal sela to the selecting unit 116a such that the internal PWM signal PWMi is inputted to the switching circuit unit 112a and the output voltage DCa is generated immediately after startup of the PLC system 1, and the PWM signal PWMa is inputted to the switching circuit unit 112a and the output voltage DCa is generated after an amount of time prescribed in advance has elapsed from startup of the PLC system 1.

Figure 4:
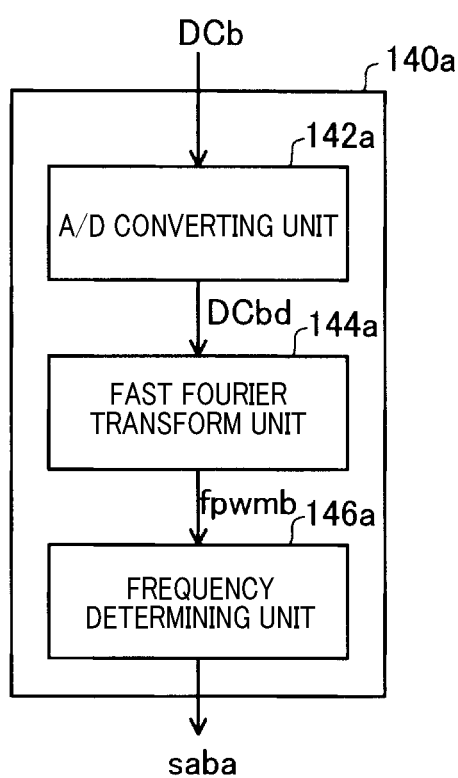
FIG. 4 is an explanatory diagram of an overall configuration of a frequency analyzing unit.

FIG. 4 is an explanatory diagram of an overall configuration of the frequency analyzing unit 140a. The frequency analyzing unit 140a includes an A/D converting unit 142a, a fast Fourier transform unit 144a, and a frequency determining unit 146a. The A/D converting unit 142a samples the inputted output voltage DCb that is an analog value at a cycle that is shorter than the cycle of the PWM signal PWMb, and converts the output voltage DCb to a voltage DCbd that is a digital value. The A/D converting unit 142a is configured by hardware. For example, various types of A/D converters, such as a flash type, a pipeline type, an interpolation type, a cascade type, a sub-ranging type, or a folding type, can be used.

For example, the fast Fourier transform unit 144a and the frequency determining unit 146a are configured by software. The fast Fourier transform unit 144a performs fast Fourier transform on the voltage DCbd that is a digital value and identifies the switching frequency of the DC-DC converter 110b. The switching frequency is equal to a frequency fpwmb of the PWM signal PWMb. The frequency determining unit 146a calculates a frequency fclkb of the clock signal clkb from the frequency fpwmb of the PWM signal PWMb, and determines whether or not the frequency fclkb is within a range prescribed in advance. The PWM signal PWMb is acquired by the frequency of the clock signal clkb being divided. Therefore, the clock signal clkb may be acquired through inverse calculation of the foregoing. Alternatively, the clock signal clkb may be acquired through multiplication of the PWM signal PWMb.

When determined that the frequency fclkb falls outside of the range prescribed in advance, the frequency determining unit 146a outputs the abnormality-notifying signal saba. Here, the frequency determining unit 146a may determine whether or not the frequency fpwmb of the PWM signal PWMb is within a range prescribed in advance. The frequency analyzing unit 140b also has a similar configuration. The output voltage DCa of the DC-DC converter 110a is inputted to the frequency analyzing unit 140b. The frequency analyzing unit 140b then calculates a frequency fclka of the clock signal clka. When determined that the frequency fclka of the clock signal clka falls outside of the range prescribed advance, the frequency analyzing unit 140b outputs an abnormality-notifying signal sabb to the PLC 20. When at least either of the abnormality-notifying signal saba and the abnormality-notifying signal sabb is received, the PLC 20 outputs a signal to stop a control target of the PLC system 100 as the signal sout. In addition, the PLC 20 outputs the stop signal stp to stop the clock signals clka and clkb to the stopping unit 160.

FIG. 5 is an operation flowchart of the operation performed by the frequency analyzing unit 140a, which will now be described in combination with FIG. 6. The frequency analyzing unit 140a performs the processes in the operation flowchart after the power of the PLC system 1 is turned on. At step S100, the power of the PLC system 1 is turned on.

At step S110, the frequency analyzing unit 140a determines whether or not a predetermined amount of time has elapsed after the power of the PLC system 1 has been turned on. When determined that the predetermined amount of time has elapsed, the frequency analyzing unit 140a proceeds to step S120. This predetermined amount of time is an amount of time until the PWM signal used for switching of the DC-DC converter 110b changes from the internal PWM signal PWMi to the PWM signal PWM.

Specifically, the timer 118a generates the selection signal sela for the selecting unit 116a. The selection signal sela is such that the internal PWM signal PWMi is inputted to the switching circuit unit 112a for a fixed amount of time after startup of the PLC system 1, and the PWM signal PWMa is inputted after the elapse of an amount of time prescribed in advance after startup. As a result, when the PLC system 1 is started, first, the internal PWM signal PWMi is inputted to the switching circuit unit 112a. The switching circuit unit 112a performs switching based on the internal PWM signal PWMi and outputs the output voltage DCa. As a result, the microcomputer 120a is activated and the PWM signal PWMa is outputted. After the elapse of the amount of time prescribed in advance after startup, the selecting unit 116a switches the PWM signal PWMa and the internal PWM signal PWMi such that the PWM signal PWMa is inputted to the switching circuit unit 112a instead of the internal PWM signal PWMi. The switching circuit unit 112a performs switching based on the PWM signal PWMa and outputs the output voltage DCa. According to the present embodiment, the timer 118a generates the selection signal sela.

However, a configuration in which, as a default, the internal PWM signal PWMi from the internal PWM signal generating unit 114a is selected, and the microcomputer 120a generates the selection signal sela can also be used. In this case, the timer 118a can be omitted.

At step S120, the A/D converter 142a samples the inputted output voltage DCb that is an analog value at a cycle that is shorter than the cycle of the PWM signal PWMb, and converts the output voltage DCb to the voltage DCbd that is a digital value (refer to part (A) of FIG. 6).

At step S130, the fast Fourier transform unit 144a performs the fast Fourier transform on the voltage DCbd that is a digital value (refer to part (B) of FIG. 6). At step S140, the fast Fourier transform unit 144a identifies (or detects) the switching frequency of the DC-DC converter 110b from the result of the fast Fourier transform (i.e., a peak gain of the FFT-performed frequency stuprum; refer to parts (B) and (C) of FIG. 6). The switching frequency is equal to the frequency fpwmb of the PWM signal PWMb.

At step S150, the frequency determining unit 146a calculates the frequency fclkb of the clock signal clkb from the frequency fpwmb (i.e., the frequency fclkb is a frequency of the peak gain; refer to part (D) of FIG. 6). At step S160, the frequency determining unit 146a determines whether or not the frequency fclkb is within a range prescribed in advance. When determined that the frequency fclkb falls outside the range prescribed in advance, the frequency determining unit 146a proceeds to step S170 and outputs the abnormality-notifying signal saba to the PLC 20, like cases shown by marks B and C exemplified in the frequency axis in part (E) of FIG. 6. When determined that the frequency fclkb does not fall outside the range prescribed in advance, the frequency determining unit 146a proceeds to step S120 and continues monitoring the output voltage DCb, like a case shown by a mark A exemplified in the frequency axis in the part (E) of FIG. 6.

The frequency analyzing unit 140b also performs similar processes. The abnormality-notifying signal saba is outputted towards the PLC 20 so that the PLC system 1 is stopped after the PLC 20 that has received the abnormality-notifying signal saba or sabb has performed a failsafe operation.

As described above, according to the present embodiment, the PLC input and output apparatus 10 includes the two sub-systems 105a and 105b. The output voltage DCa of the DC-DC converter 110a in the first sub-system 105a is inputted to the frequency analyzing unit 140b of the second sub-system 105b. The output voltage DCb of the DC-DC converter 110b in the second sub-system 105b is inputted to the frequency analyzing unit 140a of the first sub-system 105a.

As a result, the frequency analyzing units 140a and 140b mutually monitor the output voltages DCb and DCa of the DC-DC converters 110b and 110a. The switching frequencies fpwma and fpwmb of the DC-DC converters 110a and 110b are thereby analyzed, and the frequencies fclka and fclkb of the clock signals clka and clkb are acquired. Consequently, even should the clock signals clka and clkb of the two sub-systems 105a and 105b drift in the same direction, accurate frequencies fclka and fclkb of the clock signals clka and clkb can be acquired. In addition, the output voltages DCa and DCb are sampled at a cycle that is shorter than the cycle of the PWM signals PWMa and PWMb. The frequencies of the output voltages DCa and DCb are then analyzed, and the frequencies fclka and fclkb of the clock signals clka and clkb are calculated. Consequently, drifting of the frequencies fclka and fclkb of the clock signals clka and clkb can be detected.

According to the present embodiment, the frequency analyzing unit 140a includes the A/D converting unit 142a, the fast Fourier transform unit 144a, and the frequency determining unit 146a. The A/D converting unit 142a converts the output voltage DCb. Therefore, the frequency of the output voltage DCb can be easily analyzed and the frequency fclkb of the clock signal clkb can be calculated.

According to the present embodiment, the frequency analyzing unit 140a includes the fast Fourier transform unit 144a.

However, other configurations can be used, as long as the output voltage DCb can be analyzed, the frequency of the output voltage DCb can be analyzed, and the frequency fclkb of the clock signal clkb can be calculated. For example, the frequency of the output voltage DCb may be analyzed through use of a digital filter after the output voltage DCb undergoes A/D conversion. In addition, frequencies outside a predetermined frequency component range may be removed from the frequencies of the output voltage DCb through use of a window filter. The frequency determining unit 146a may then analyze the remaining frequency components of the output voltage DCb, and the frequency fclkb of the clock signal clkb may be calculated.

A combination of a low-pass filter and a high-pass filter may be used instead of the window filter. When the window filter, or the low-pass filter and the high-pass filter are used, the AD converter may be omitted. This similarly applies to the frequency analyzing unit 140b.

According to the present embodiment, a configuration in which two sub-systems are provided is used. However, all that is required is that the configuration include a plurality of sub-systems. For example, when three or more sub-systems are provided, the sub-systems may be connected such that the output of the DC-DC converter of a first sub-system is inputted to the frequency analyzing unit of a second sub-system, the output of the DC-DC converter of the second sub-system is inputted to the frequency analyzing unit of a third sub-system, and the output of the DC-DC converter of the third sub-system is inputted to the frequency analyzing unit of the first sub-system.

In addition, in the configuration in which two sub-systems are provided, only a configuration in which the output of the DC-DC converter 110a in the first sub-system 105a is inputted to the frequency analyzing unit 140b of the second sub-system 105b may be provided, so that the frequency analyzing unit 140b is still able to analyze the frequency fclka of the clock signal clka.

According to the present embodiment, the signal sin is inputted to the first sub-system 105a. The signal sout is inputted to the second sub-system 105b. However, a configuration in which the signal sout is inputted to the first sub-system 105 and the signal sin is inputted to the second sub-system 105b is also possible. Alternatively, a configuration in which both signals sin and sout are inputted to the first sub-system 105a is possible. Still further, a configuration in which both signals sin and sout are inputted to the second sub-system 105b is also possible.

The present disclosure is not limited to the above-described embodiment and may be actualized by various configurations without departing from the spirit of the disclosure. For example, technical features according to the embodiment that correspond to technical features according to aspects described in the summary of the disclosure can be replaced or combined as appropriate to solve some or all of the above-described issues or achieve some or all of the above-described effects. Furthermore, the technical features may be omitted as appropriate unless described as a requisite in the present specification.

PARTIAL EXPLANATION OF REFERENCE NUMBERS

1: PLC system
10: (PLC) input and output apparatus

20: PLC
100: microcomputer unit
105a: first sub-system
105b: second sub-system
110a, 110b: DC-DC converter
112a: switching circuit unit
114a: internal PWM signal generating unit
116a: selecting unit
118a: timer
120a, 120b: microcomputer
130a, 130b: PWM signal generating unit
140a, 140b: frequency analyzing unit
142a: A/D converting unit
144a: fast Fourier transform unit
146a: frequency determining unit
150a, 150b: clock generating unit
160: stopping unit
170: input circuit
180: communication circuit
190: output circuit
DCa, DCb: output voltage
DCbd: voltage
PWMa, PWMb: PWM signal
PWMi: internal PWM signal
VDD: external power supply
clka, clkb: clock signal
fclkb: frequency
fpwmb: frequency
saba, sabb: abnormality-notifying signal
sela: selection signal
sin: (input) signal
sout: (output) signal
stp: stop signal

What is claimed is:

1. An input and output apparatus comprising:
at least a first sub-system and a second sub-system, wherein
the sub-system includes
a direct current-to-direct current converter that controls an output voltage to a target voltage by switching a pulse width modulation signal,
a clock signal generating unit that generates a clock signal, and
a microcomputer that is supplied electric power from the direct current-to-direct current converter and driven by the clock signal,
the microcomputer includes
a pulse width modulation signal generating unit that generates the pulse width modulation signal using the clock signal, and
a frequency analyzing unit that samples an inputted voltage at a cycle that is shorter than a cycle of the pulse width modulation signal and analyzes the frequency of the inputted voltage,
the frequency analyzing unit acquires a frequency of the pulse width modulation signal from the frequency of the inputted voltage, calculates a frequency of the clock signal, and outputs a signal notifying an abnormality state of the system, outside the input and output apparatus when the frequency of the clock signal falls outside a range prescribed in advance, and
the output voltage of the direct current-to-direct current converter of the first sub-system is inputted to the frequency analyzing unit of the second sub-system.

2. The input and output apparatus according to claim 1, wherein:
the output voltage of the direct current-to-direct current converter of the second sub-system is inputted to the frequency analyzing unit of the first sub-system.

3. The input and output apparatus according to claim 2, wherein:
the frequency analyzing unit includes
an analog-to-digital converting unit that performs an analog-to-digital conversion on an inputted voltage,
a fast Fourier transform unit, and
a frequency determining unit.

4. The input and output apparatus according to claim 3, wherein:
the direct current-to-direct current converter includes
an internal pulse width modulation signal generating unit that generates an internal pulse width modulation signal that is a pulse width modulation signal that differs from the pulse width modulation signal, and
a selecting unit that selects between the pulse width modulation signal inputted from outside the sub-system and the internal pulse width modulation signal, and
the selecting unit selects the internal pulse width modulation signal as a signal to be used for switching immediately after startup, and switches from the internal pulse width modulation signal to the pulse width modulation signal inputted from outside the sub-system after elapse of an amount of time prescribed in advance after startup.

5. The input and output apparatus according to claim 2, further comprising:
a stopping unit that stops the clock signal generating unit of the sub-system when a stop signal from outside the input and output apparatus is received.

6. The input and output apparatus according to claim 1, wherein:
the frequency analyzing unit includes
an analog-to-digital converting unit that performs an analog-to-digital conversion on an inputted voltage,
a fast Fourier transform unit, and
a frequency determining unit.

7. The input and output apparatus according to claim 6, wherein:
the direct current-to-direct current converter includes
an internal pulse width modulation signal generating unit that generates an internal pulse width modulation signal that is a pulse width modulation signal that differs from the pulse width modulation signal, and
a selecting unit that selects between the pulse width modulation signal inputted from outside the sub-system and the internal pulse width modulation signal, and
the selecting unit selects the internal pulse width modulation signal as a signal to be used for switching immediately after startup, and switches from the internal pulse width modulation signal to the pulse width modulation signal inputted from outside the sub-system after elapse of an amount of time prescribed in advance after startup.

8. The input and output apparatus according to claim 7, further comprising:
a stopping unit that stops the clock signal generating unit of the sub-system when a stop signal from outside the input and output apparatus is received.

9. The input and output apparatus according to claim 1, wherein:

the direct current-to-direct current converter includes
an internal pulse width modulation signal generating unit that generates an internal pulse width modulation signal that is a pulse width modulation signal that differs from the pulse width modulation signal, and
a selecting unit that selects between the pulse width modulation signal inputted from outside the sub-system and the internal pulse width modulation signal, and
the selecting unit selects the internal pulse width modulation signal as a signal to be used for switching immediately after startup, and switches from the internal pulse width modulation signal to the pulse width modulation signal inputted from outside the sub-system after elapse of an amount of time prescribed in advance after startup.

10. The input and output apparatus according to claim 9, further comprising:
a stopping unit that stops the clock signal generating unit of the sub-system when a stop signal from outside the input and output apparatus is received.

11. The input and output apparatus according to claim 1, further comprising:
a stopping unit that stops the clock signal generating unit of the sub-system when a stop signal from outside the input and output apparatus is received.

* * * * *